UNITED STATES PATENT OFFICE.

ALCIDE FRANCOIS POIRRIER, OF PARIS, FRANCE.

BLACK SUBSTANTIVE SULFUR DYE AND PROCESS OF MAKING SAME.

SPECIFICATION forming part of Letters Patent No. 665,547, dated January 8, 1901.

Application filed May 16, 1899. Serial No. 717,039. (No specimens.)

*To all whom it may concern:*

Be it known that I, ALCIDE FRANCOIS POIRRIER, of Paris, France, have invented new and useful Improvements in Black Substantive Sulfurized Dyestuffs, which improvement is fully set forth in the following specification.

I find that new black, substantive dyestuffs of much importance in dyeing cotton are obtainable by melting with sulfur alone or with sulfur and sodium sulfid certain dyestuffs of the indophenol group or of the indoanilin group. These dyestuffs, which form the raw material for the dyestuffs manufactured as herein set forth, are made in the known manner by oxidizing a mixture of paraphenylenediamin or paramidophenol on the one hand with phenols or naphthols on the other hand. These easily-prepared dyestuffs are then treated in the known manner, as in the following example.

Example: Into fifteen kilos of melted sulfur kept at a temperature of about 130° to 140° centigrade are introduced ten kilos of the dyestuff prepared from paraphenylenediamin and naphthol, and the mass is heated for four hours, the temperature being gradually raised to about 200° centigrade. There is thus obtained a friable brittle mass, which is pulverized and introduced in small portions at a time into from sixty to eighty kilos of crystallized sodium sulfid previously fused and evaporated to a syrupy consistency. Equally well after having allowed the mass to cool the sodium sulfid may be added and heated gradually. When once melted the sodium sulfid dissolves little by little the product formed, and there is obtained a pasty mass, which is then heated to about 200° to 250° centigrade. Energetic reaction ensues, and the mass then slowly dries, becoming hard and brittle, in which condition it is suitable for use. In this example, as well as in the claims for the dyestuff mentioned, may be substituted any other dyestuffs belonging to the indophenol group or indo-anilin group, and the proportion of sulfur and sodium sulfid, as well as the temperature and the duration of heating, may be varied without sensibly modifying the dyestuffs obtained.

By treating according to the process herein described the coloring-matter resulting from the oxidation of an equimolecular mixture of para-phenylenediamin and alpha-naphthol I obtain a bluish-black powder, which when melted in sulfid of sodium is soluble in water. The solution is of a brownish-green color and is precipitated by the acids in the form of blackened yellowish-brown flakes and melts rapidly in the air. Common salt also precipitates the coloring-matter from its solutions. The water solution dyes unmordanted cotton at the boiling-point in the presence of a little common salt. The dyes fixed by oxidation with bichromate of potash are black with blue reflection. In a similar manner by treating according to the process herein described the coloring-matter resulting from the oxidation of an equimolecular mixture of paraphenylenediamin and phenol I obtain a coloring-matter of a very slightly greenish-black appearance, which is very easily soluble in boiling water. The solution thus obtained is of a pretty-dark greenish black. It is precipitated by the acids or by common salt. In the first case the precipitate obtained is of chocolate-brown color and in the air becomes pretty rapidly oxidized into a brownish black. In the second case it is greenish black. The water solution dyes the unmordanted cotton very easily at the boiling-point in the presence of common salt and gives very handsome black colors with purplish reflections after fixation by oxidation with bichromate of potash.

In referring in this specification to the "indophenolic" groups I have followed the classification adopted by Behel and other authors, who also apply that term to a specific class coming under the general group termed "indophenolic." To make the description and claims entirely clear, it may be stated that the coloring-matters treated according to this invention belong to a general class represented by the formula

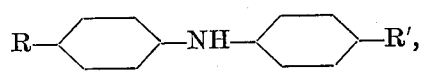

in which R and R' are either OH or NH$_2$. When R and R' are both NH$_2$ groups, the corresponding coloring-matters are termed "indamins." These form no part of the present invention.

When R is an OH group and R' an NH$_2$, or when both are OH groups, the derived coloring-matters are those which are treated according to this invention and which are designated by Julius by the generic terms "indo-anilin" and "indophenolic," distinguishing them from the "indamins" above referred to. These two species are equivalent for the purposes of the present invention.

In the following claims the term "indophenolic" is employed with its generic meaning.

I claim—

1. The process of manufacturing black substantive coloring-matters which process consists in heating the herein-described coloring-matters of the indophenolic group with sulfur.

2. The process of manufacturing black substantive coloring-matters which process consists first in heating the herein-described coloring-matters of the indophenolic group with sulfur and then heating the resulting mass with sodium sulfid.

3. The described coloring-matter obtained by heating the herein-described coloring-matters of the indophenolic group with sulfur and then heating the resulting mass with sodium sulfid, said coloring-matter being soluble in water; may be precipitated from its solution by acids, and readily dyes unmordanted cotton at the boiling-point.

In witness whereof I have hereunto signed my name in the presence of two subscribing witnesses.

ALCIDE FRANCOIS POIRRIER.

Witnesses:
JULES ARMENGAUD, Jeune,
J. ALLISON BOWEN.